(12) United States Patent
Pettit et al.

(10) Patent No.: US 7,597,975 B2
(45) Date of Patent: Oct. 6, 2009

(54) FUEL CELL OPERATION TO MINIMIZE RH CYCLES TO IMPROVE DURABILITY

(75) Inventors: William H. Pettit, Rochester, NY (US); John C. Fagley, Victor, NY (US); John P. Salvador, Penfield, NY (US); Steven G. Goebel, Victor, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 697 days.

(21) Appl. No.: 11/434,385

(22) Filed: May 15, 2006

(65) Prior Publication Data

US 2007/0265802 A1 Nov. 15, 2007

(51) Int. Cl.
*H01M 8/00* (2006.01)
*H01M 8/04* (2006.01)
*G05D 22/00* (2006.01)

(52) U.S. Cl. .......................... 429/13; 429/22; 429/23; 429/24; 429/25; 700/286; 236/44 R

(58) Field of Classification Search ................. 429/13, 429/22–25; 700/286; 236/44 R
See application file for complete search history.

(56) References Cited

U.S. PATENT DOCUMENTS

2006/0263653 A1* 11/2006 Sinha et al. .................. 429/13

* cited by examiner

*Primary Examiner*—Jerry Lorengo
*Assistant Examiner*—Kevin M Johnson

(57) ABSTRACT

A fuel cell system that includes an over-arching algorithm for providing a strategy that reduces relative humidity cycling of the cathode outlet gas between wet and dry operation to extend the useful life of the membrane. The algorithm receives sensor signals indicative of operating parameters of the fuel cell system. The algorithm maintains a cathode exhaust gas relative humidity in a wet operating mode if the operating parameters of the fuel cell system are able to sustain the cathode gas relative humidity above a first predetermined value, and maintains the cathode exhaust gas relative humidity in a dry operating mode if the operating parameters of the fuel cell system are able to sustain the cathode gas relative humidity below a second predetermined value.

19 Claims, 3 Drawing Sheets

FUEL CELL OPERATION TO MINIMIZE RH CYCLES TO IMPROVE DURABILITY

BACKGROUND OF THE INVENTION

1. Field of the Invention

This invention relates generally to a fuel cell system that employs an algorithm providing a strategy for maintaining the cathode outlet gas humidity and, more particularly, to a fuel cell system that employs an over-arching algorithm for maintaining the cathode outlet gas humidity at a wet or dry mode of operation so as to prevent membrane humidity cycling.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. Each bipolar plate includes an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. The bipolar plates are made of a conductive material, such as stainless steel, so that they conduct the electricity generated by the fuel cells out of the stack. The bipolar plates also include flow channels through which a cooling fluid flows.

Excessive stack temperatures may damage the membranes and other materials in the stack. Fuel cell systems therefore employ a thermal sub-system to control the temperature of the fuel cell stack. Particularly, a cooling fluid is pumped through the cooling fluid flow channels in the bipolar plates in the stack to draw away stack waste heat. During normal fuel cell stack operation, the speed of the pump is controlled based on the stack load, the ambient temperature and other factors, so that the operating temperature of the stack is maintained at an optimal temperature, for example 80° C. A radiator is typically provided in a coolant loop outside of the stack that cools the cooling fluid heated by the stack where the cooled cooling fluid is cycled back through the stack.

As is well understood in the art, fuel cell membranes operate with a certain relative humidity (RH). The relative humidity of the cathode outlet gas from the fuel cell stack is controlled to control the relative humidity of the membranes by controlling several stack operating parameters, such as stack pressure, temperature, cathode stoichiometry and the relative humidity of the cathode air into the stack. For stack durability purposes, it is desirable to minimize the number of relative humidity cycles of the membrane because cycling between RH extremes has been shown to severely limit membrane life. As used herein, RH cycling refers to a changing membrane relative humidity above and below 100%. Membrane RH cycling causes the membrane to expand and contract as a result of the absorption of water and subsequent drying. This expansion and contraction of the membrane causes pin holes in the membrane, which create hydrogen and oxygen cross-over through the membrane creating hot spots that further increase the size of the hole in the membrane, thus reducing its life.

During cold start-up of the fuel cell system, the relative humidity of the cathode outlet gas would typically exceed 100% because the cold cathode exhaust gas is unable to hold very much water vapor. As the fuel cell stack heats up, and the load on the stack increases, the heat rejection capability of the thermal sub-system would typically not be sufficient to sustain the cathode outlet gas relative humidity over 100% because this would require a large thermal sub-system cooling capacity. Therefore, a transition of reducing the relative humidity of the cathode outlet gas would occur to a dryer membrane condition. Many factors go into whether the fuel cell system is operating in a wet or dry condition, including load on the stack, ambient temperature, cooling capacity of the thermal sub-system, etc.

As the operating conditions of the fuel cell system change, the relative humidity of the cathode outlet gas tends to cycle back and forth between a wet operating condition and a dry operating condition. As used herein, the wet operating condition refers to a relative humidity of the cathode exhaust gas greater than 100% and the dry operating condition refers to a relative humidity of the cathode exhaust gas less than 100%. Therefore, it would be desirable to reduce the membrane RH cycling during operation of the stack to increase the life of the membranes in the stack.

SUMMARY OF THE INVENTION

In accordance with the teachings of the present invention, a fuel cell system is disclosed that includes an over-arching algorithm for providing a strategy that reduces relative humidity cycling of the cathode outlet gas between wet and dry operation to extend the useful life of the membrane. The fuel cell system includes a controller that controls the various system components, such as valves, compressors, etc., in the fuel cell system based on sensor readings from sensors and a power request from the vehicle operator. The over-arching algorithm uses the sensor readings from the sensors to provide a desirable relative humidity set-point of the cathode exhaust gas that is also used by the controller to set the actuator settings to reduce the RH cycling.

At cold start-up, the algorithm provides an RH set-point for a wet operating mode where the relative humidity of the cathode exhaust gas is maintained at a percentage above 100% based on the current operating conditions of the system. During fuel cell system operation, the algorithm uses the sensor readings to calculate a maximum relative humidity sustainable by the system. The algorithm then determines whether the maximum relative humidity is above a predetermined percentage that is in the wet operating mode of the system. If the current operating conditions of the system are able to sustain the wet operating mode, then the algorithm provides the relative humidity set-point to the controller so that the controller controls the system components for the wet operating mode. If the sensor signals indicate that the system is not able to sustain the wet operating mode, then the algorithm provides a relative humidity set-point for a dry operating mode, and the controller controls the system components accordingly to maintain that relative humidity.

Once the algorithm switches from the wet operating mode to the dry operating mode, the algorithm then calculates a minimum relative humidity of the cathode outlet gas based on the sensor signals to maintain the dry operating mode. If the operating conditions of the system change so that they are unable to sustain the dry operating mode, then the algorithm switches the set-point back to the wet operating mode.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system employing an over-arching algorithm that reduces RH cycling of the cathode exhaust gas is merely exemplary in nature, and is in no way intended to limit the invention or its applications or uses.

Figure 1:
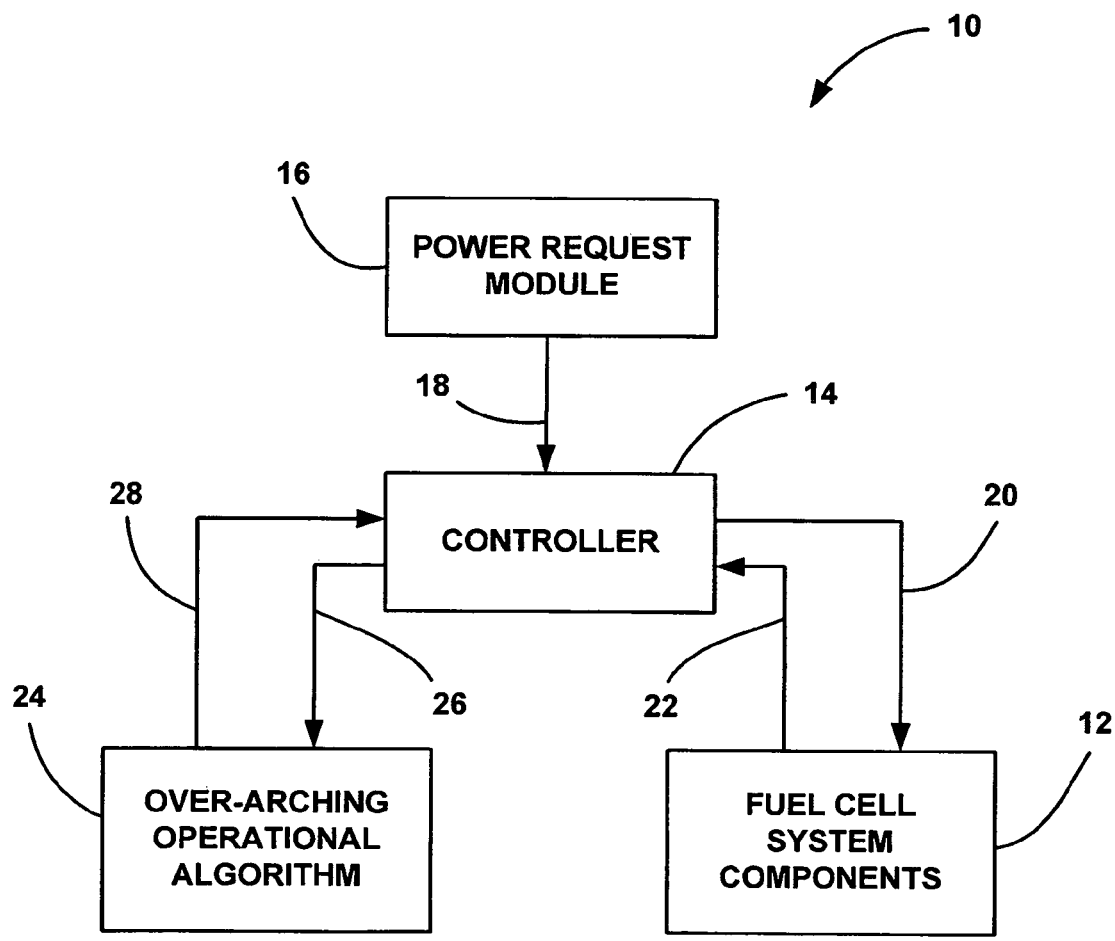
FIG. 1 is a block diagram of a fuel cell system employing an over-arching algorithm for providing an RH set-point for the cathode outlet gas, according to an embodiment of the present invention.

FIG. 1 is a block diagram of a fuel cell system 10 including fuel cell system components 12, including a fuel cell stack. As discussed above, a cathode outlet gas from the fuel cell stack will have a certain relative humidity that defines the relative humidity of the membranes in the stack. As discussed herein, a wet operating mode refers to the cathode outlet gas having a relative humidity greater than 100% and a dry operating mode refers to the cathode outlet gas having a relative humidity less than 100%. As a result of cell-to-cell variations and flow uncertainties, to ensure a wet or dry operating mode of all of the fuel cells in the stack, the nominal RH operating point for the wet operating mode may be 120% and the nominal RH operating point for the dry operating mode may be 80%. However, as will be appreciated by those skilled in the art, these values are merely representative as other RH values may be equally applicable.

The fuel cell system 10 includes a controller 14 that controls the operation of the fuel cell system components 12. The fuel cell system 10 also includes a power request module 16 that provides a power request signal from the vehicle operator on line 18. The controller 14 provides actuator setting signals on line 20 that set the position of the various actuators and other components in the fuel cell system components 12, such as compressor speed, pump speed, radiator cooling fan speed, valve positions, etc., based on sensor signals from the components 12 on line 22, such as pressure sensors, temperature sensors, relative humidity sensors, etc., and a relative humidity set-point on line 28, as will be discussed in detail below.

According to the invention, the fuel cell system 10 includes an over-arching operational algorithm 24 that provides the RH set-point on the line 28. The algorithm 24 receives the sensor signals on line 26 from the controller 14 that are representative of the sensor signals provided on the line 22. Based on the sensor signals, the algorithm 24 determines whether the operating conditions of the system 10 can sustain a wet operating mode if the system 10 is currently operating in the wet operating mode or sustain a dry operating mode if the system 10 is currently operating in a dry operating mode. Based on that determination, the algorithm 24 provides the RH set-point signal on the line 28 to the controller 14 so that the controller 14 can use the set-point to control the actuator settings on the line 20 in combination with the power request on the line 18 and the sensor signals on the line 22. In this manner, the algorithm 24 reduces the RH cycling of the cathode exhaust gas so as to reduce the mechanical stress on the membranes in the fuel cell stack, thus increasing stack life.

Figure 2:
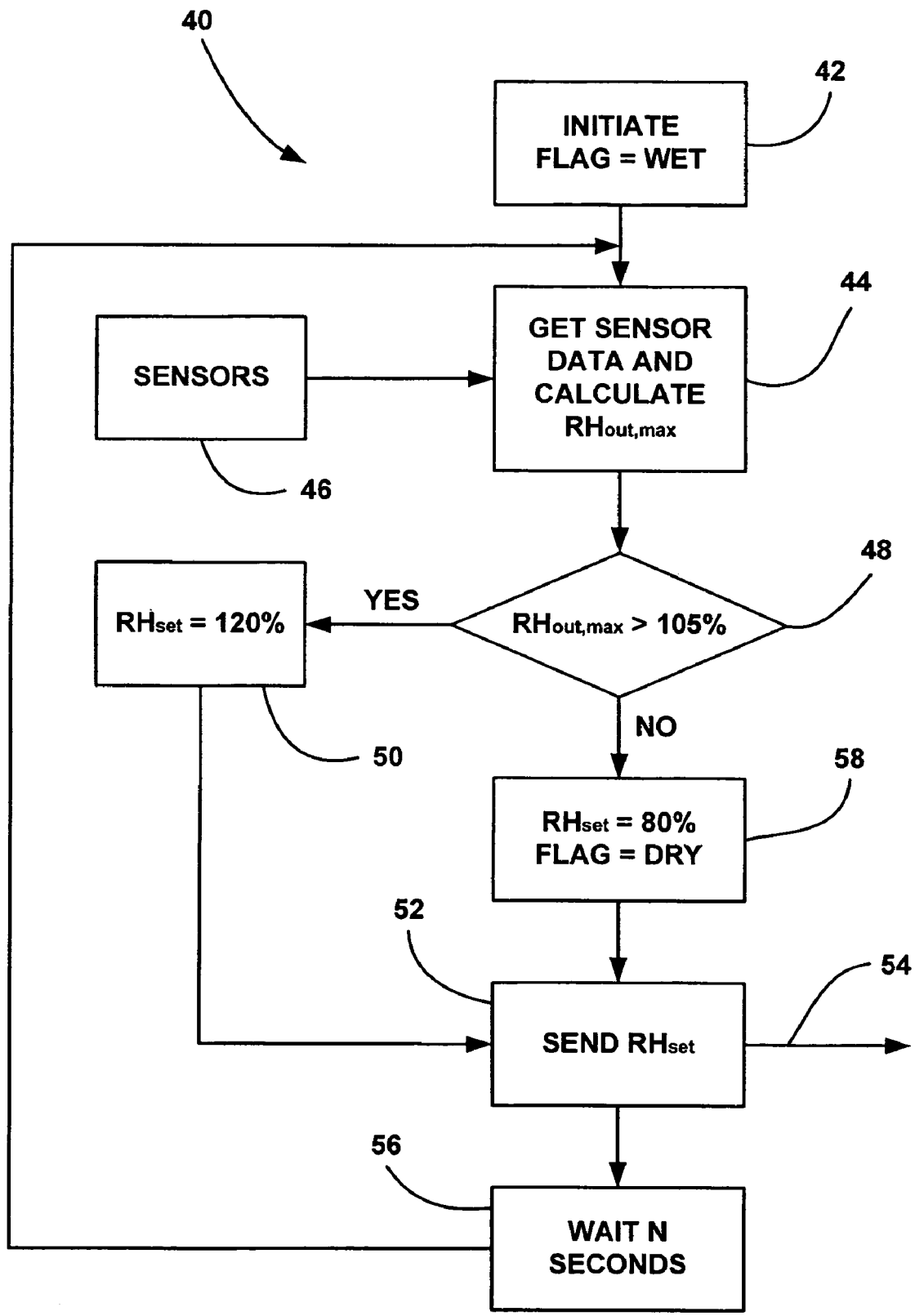
FIG. 2 is a flow chart diagram showing the operation of the over-arching algorithm for maintaining the relative humidity set-point of the cathode exhaust gas for a wet operating mode.

FIG. 2 is a flow chart diagram 40 showing the operation of the over-arching algorithm 24 for attempting to maintain the wet operating mode of the system 10. Typically, the fuel cell system 10 starts cold where the ability of the cathode exhaust gas to hold water vapor is low. At the initiation of the over-arching algorithm 24, a flag is set to the wet operating mode at box 42. The algorithm 24 then gets the sensor signals from sensors 46, representing the sensors discussed above, and calculates a maximum sustainable relative humidity of the cathode exhaust gas at box 44. The algorithm 24 attempts to stay in the wet operating mode for as long as possible after fuel cell system start-up by using operational strategies, such as making maximum use of the radiator. The algorithm 24 uses the sensor signals from the sensors 46 to determine whether the system 10 can sustain the wet operating mode for the current operational parameters by calculating the maximum sustainable relative humidity. The equations used to calculate the maximum relative humidity would be well known to those skilled in the art.

The algorithm 24 then compares the maximum sustainable relative humidity to a predetermined relative humidity percentage in the wet operating range at decision diamond 48. In this example, the predetermined wet relative humidity percentage is 105%, however, this is by way of a non-limiting example in that other values can also be used that are above 100%. If the calculated maximum sustainable relative humidity is greater than the predetermined wet percentage, then the algorithm 24 sets the wet relative humidity set-point to a predetermined relative humidity percentage set-point, such as 120%, at box 50. As discussed above, the relative humidity set-point of 120% for the wet operating mode is by way of a non-limiting example in that other relative humidity set-points can be used for the wet operating mode. The algorithm 24 then sends the relative humidity set-point to the controller 14 at box 52 on line 54 representing the line 28. The algorithm then waits a predetermined period of time, such as one second, at box 56, and returns to the step of receiving sensor signals and calculating the maximum relative humidity at the box 44.

After system start-up, many factors will affect whether the operating condition of the system 10 can be maintained in the wet operating mode, such as frequency and extent of accelerations, time spent at idle, towing, trip duration, ambient temperatures, etc. However, if these various factors cause the algorithm 24 to calculate the maximum sustainable relative humidity to be less than 105% at the decision diamond 48, then the system 10 must now switch to the dry operating mode where the flag is set to the dry mode at box 58. Further, the RH set-point is set to a dry relative humidity set-point, for example 80%, for the dry operating mode, which is sent by the algorithm 24 at box 52 on the line 54. Now, the algorithm 24 will attempt to maintain the operating mode of the system 10 in the dry operating mode.

Certain heuristics can be built into the system 10 to control the switching between the wet operating mode and the dry operating mode. For example, the threshold relative humidity value as discussed above and the wait time between sampling the sensor signals can be optimized for certain driving patterns, vehicle characteristics, ambient temperature, etc. In addition, logic can be used so that if there are a certain number of transitions between the wet and dry modes over the past predetermined number of minutes, the system does not return to the wet operating mode for at least a predetermined number of minutes, or alternatively, switches to the dry operating mode. These settings will help avoid repeatedly cycling between the wet and dry modes for situation where the stack load is cycling.

Figure 3:
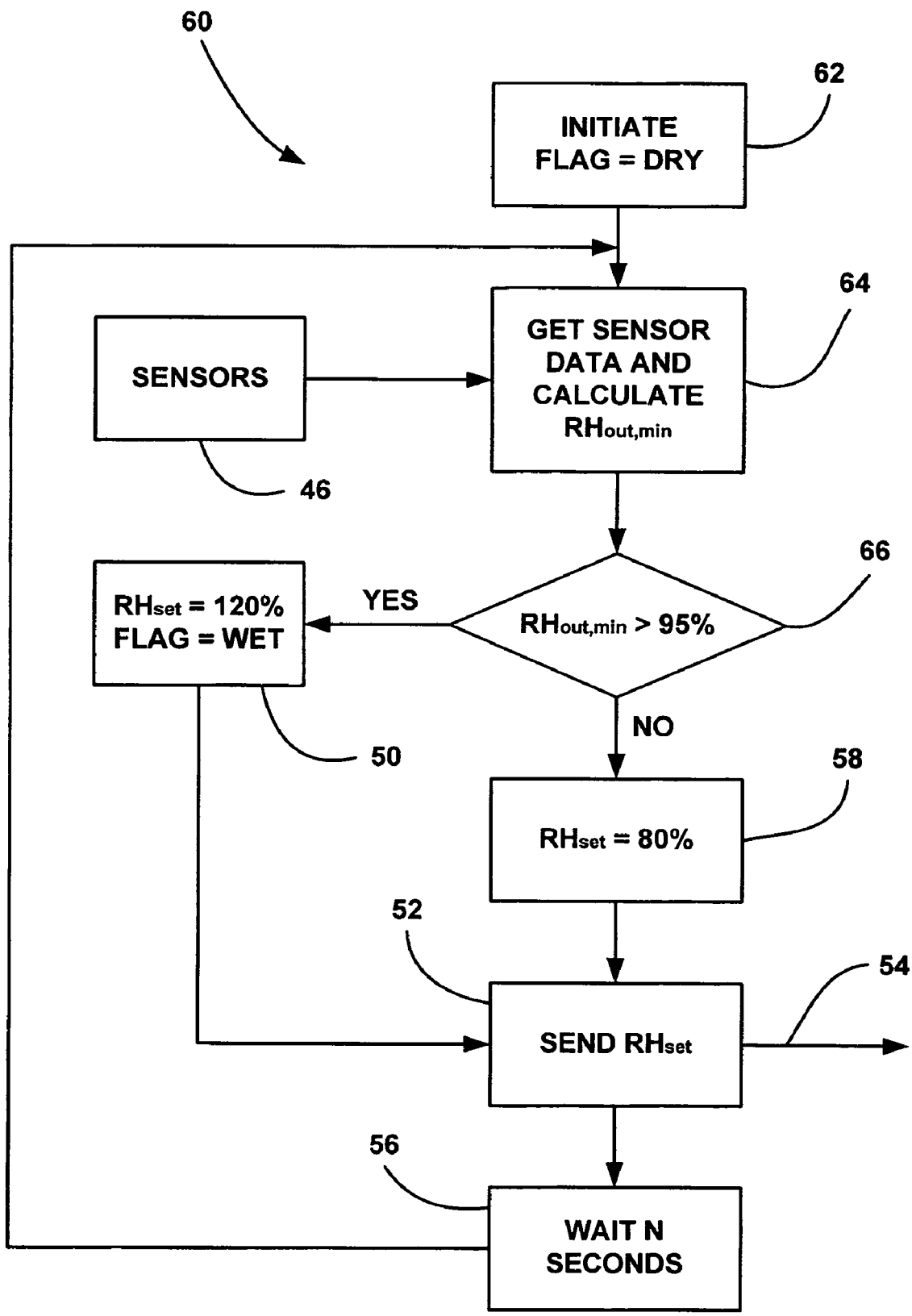
FIG. 3 is a flow chart diagram showing the operation of the over-arching algorithm for maintaining the relative humidity set-point of the cathode exhaust gas for a dry operating mode.

Once the algorithm 24 has switched to the dry operating mode, the algorithm 24 switches to a dry mode strategy. FIG. 3 is a flow chart diagram 60 showing the dry operating mode strategy, where the same steps are identified by the same reference numeral. The algorithm 24 initiates the dry mode strategy at box 62, where the flag has been set to dry. The algorithm 24 then gets the sensor signals from the sensors 46, and calculates a minimum sustainable relative humidity based on the operating conditions of the system 10 at box 64. Those skilled in the art would know what equations can be used to calculate the minimum relative humidity.

The algorithm 24 then determines if the minimum sustainable relative humidity is greater than a predetermined relative humidity percentage that is below 100% in the dry mode operating range at the decision diamond 66. In this embodiment, that value is 95%, however, this is by way of a non-limiting example. The calculation of the minimum sustainable relative humidity at the box 64 considers certain operating conditions, such as sufficiently humidified cathode input gas to avoid membrane drying and a reasonably low cathode stoichiometry to achieve high system efficiency. If the current operating parameters of the system 10 are able to sustain a relative humidity below 95%, then the algorithm 24 maintains the relative humidity set-point at 80% at the box 58, and sends the RH set-point at the box 52 to the controller 14 on the line 54. If, however, the minimum sustainable relative humidity is greater than 95% at the decision diamond 66, then the algorithms 24 switches to the wet operating mode by setting the relative humidity set-point to 120% and the flag to wet at the box 50. The algorithm 24 then transmits the wet mode RH set-point at the box 52 on the line 54.

As discussed above, certain heuristics can be built into the system 10. For example, the threshold RH values and the wait time between sampling the sensor signals can be optimized for driving standards, vehicle characteristics, ambient temperature, etc. In addition, logic can be used so that if a certain number of transitions between the wet and dry modes have occurred over the past predetermined number of minutes, the system does not return to the dry operating mode for at least a predetermined number of minutes, or alternatively, switches to the wet mode strategy.

Based on ambient conditions, driving patterns, etc., the strategy may be to either run in the wet mode or the dry mode. If the current strategy is not working properly, for example, the system 10 is in the wet mode and there are frequent dry mode excursions, the decision can be made to switch to the alternative strategy. In this way, cycling between wet and dry mode operations can be minimized.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling a relative humidity of a cathode exhaust gas from a fuel cell stack in a fuel cell system, said method comprising:
providing sensor signals indicative of operating parameters of the fuel cell system;
calculating a maximum sustainable relative humidity of the cathode exhaust gas based on the sensor signals;
determining if the calculated maximum sustainable relative humidity is greater than a predetermined percentage;
providing a relative humidity set-point above 100% if the calculated maximum sustainable relative humidity is greater than the predetermined percentage;
providing a relative humidity set-point below 100% if the calculated maximum sustainable relative humidity is less than the predetermined percentage; and
controlling fuel cell system components based on the relative humidity set-point to attempt to maintain the relative humidity of the cathode exhaust gas at the set-point.

2. The method according to claim 1 further comprising waiting a predetermined period of time after the relative humidity set-point has been determined to again provide the sensor signals and calculate the maximum sustainable relative humidity.

3. The method according to claim 2 wherein waiting a predetermined period of time includes waiting a period of time that is based on the predetermined percentage, vehicle driving patterns, vehicle characteristics and ambient temperature.

4. The method according to claim 1 wherein controlling fuel cell system components includes controlling fuel cell system components based on the relative humidity set-point in combination with a stack power request and the sensor signals.

5. The method according to claim 1 wherein the predetermined percentage is about 105%.

6. The method according to claim 1 wherein the relative humidity set-point above 100% is about 120%.

7. The method according to claim 1 wherein the relative humidity set-point below 100% is about 80%.

8. A method for controlling a relative humidity of a cathode exhaust gas from a fuel cell stack in a fuel cell system, said method comprising:
providing sensor signals indicative of operating parameters of the fuel cell system;

calculating a minimum sustainable relative humidity of the cathode exhaust gas based on the sensor signals;

determining if the calculated minimum sustainable relative humidity is less than a predetermined percentage;

providing a relative humidity set-point above 100% if the calculated minimum sustainable relative humidity is greater than the predetermined percentage;

providing a relative humidity set-point below 100% if the calculated minimum sustainable relative humidity is less than the predetermined percentage; and controlling fuel cell system components based on the relative humidity set-point to attempt to maintain the relative humidity of the cathode exhaust gas at the set-point.

9. The method according to claim 8 further comprising waiting a predetermined period of time after the relative humidity set-point has been determined to again provide the sensor signals and calculate the minimum sustainable relative humidity.

10. The method according to claim 9 wherein waiting a predetermined period of time includes waiting a period of time that is based on the predetermined percentage, vehicle driving patterns, vehicle characteristics and ambient temperature.

11. The method according to claim 8 wherein controlling fuel cell system components includes controlling fuel cell system components based on the relative humidity set-point in combination with a stack power request and the sensor signals.

12. The method according to claim 8 wherein the predetermined percentage is about 95%.

13. The method according to claim 8 wherein the relative humidity set-point above 100% is about 120%.

14. The method according to claim 8 wherein the relative humidity set-point below 100% is about 80%.

15. A method for controlling a relative humidity of a cathode exhaust gas from a fuel cell stack in a fuel cell system, said method comprising:

providing sensor signals indicative of operating parameters of the fuel cell system;

maintaining the cathode exhaust gas relative humidity in a wet operating mode if the operating parameters of the fuel cell system are able to sustain the cathode gas relative humidity above a first predetermined value; and maintaining the cathode exhaust gas relative humidity in a dry operating mode if the operating parameters of the fuel cell system are able to sustain the cathode gas relative humidity below a second predetermined value.

16. The method according to claim 15 further comprising changing to maintaining the cathode exhaust relative humidity in the dry operating mode if the operating parameters of the fuel cell system are unable to sustain the cathode gas relative humidity above the first predetermined value.

17. The method according to claim 15 further comprising changing to maintaining the cathode exhaust relative humidity in the wet operating mode if the operating parameters of the fuel cell system are unable to sustain the cathode gas relative humidity below the second predetermined value.

18. The method according to claim 15 wherein the first predetermined value is about 105%.

19. The method according to claim 15 wherein the second predetermined value is about 95%.

* * * * *